United States Patent [19]

Prehn

[11] Patent Number: 5,798,807
[45] Date of Patent: Aug. 25, 1998

[54] IMAGE MODULATION PROCESS AND DEVICE FOR GENERATING OPTICAL EFFECTS

[76] Inventor: Horst Prehn, Glockenstrasse 4, D-35305 Gruenberg 1, Germany

[21] Appl. No.: 507,335

[22] PCT Filed: Jan. 28, 1994

[86] PCT No.: PCT/EP94/00245

§ 371 Date: Oct. 19, 1995

§ 102(e) Date: Oct. 19, 1995

[87] PCT Pub. No.: WO94/18598

PCT Pub. Date: Aug. 18, 1994

[30] Foreign Application Priority Data

Feb. 3, 1993 [DE] Germany ............ 43 02 945.0

[51] Int. Cl.$^6$ ............ G02F 1/1347; G02F 1/133
[52] U.S. Cl. ............ 349/76; 349/23
[58] Field of Search ............ 359/53, 51, 52, 359/73, 43, 46; 349/74, 75, 76, 102, 179, 19, 23

[56] References Cited

U.S. PATENT DOCUMENTS

| | | | |
|---|---|---|---|
| 3,837,423 | 9/1974 | Mailer | 349/23 |
| 4,017,156 | 4/1977 | Moriyama et al. | 359/53 |
| 4,239,349 | 12/1980 | Scheffer | 359/68 |
| 4,652,086 | 3/1987 | Sandhu | 349/23 |
| 4,813,770 | 3/1989 | Clerc et al. | 359/53 |
| 4,838,655 | 6/1989 | Hunahata et al. | 359/53 |
| 4,952,036 | 8/1990 | Gulick et al. | 359/53 |
| 5,296,952 | 3/1994 | Takatsu et al. | 359/53 |
| 5,412,500 | 5/1995 | Fergason | 349/76 |
| 5,457,551 | 10/1995 | Culter et al. | 359/53 |

FOREIGN PATENT DOCUMENTS

| | | | |
|---|---|---|---|
| 60-53932 | 3/1985 | Japan | 359/53 |
| 2066498 | 7/1981 | United Kingdom | 359/53 |

OTHER PUBLICATIONS

"A new liquid crystal Acoustical–to–Optical Display" P. Greguss, Acustica, vol. 29 (pp. 52–57), 1973.

"Ultrasonic modulation of light with a liquid crystal in the smectic–A and nematic phases" R Bartolino et al., Journal of Applied Physics, vol. 46, No. 5, pp. 1928–1933, May 1975.

"Acousto–Optical Effects in a nematic liquid crystal", S Nagai et al., vol. 12, pp. 21–29, Jan. 1977.

Primary Examiner—William L. Sikes
Assistant Examiner—Tiep H. Nguyen
Attorney, Agent, or Firm—Flynn, Thiel, Boutell & Tanis, P.C.

[57] ABSTRACT

In order to generate dynamic images whose structure (spatial frequency) or chromaticity may be modulated or controlled by various low frequency signal sources, a rotary-dispersive, optical element (NC) which may be varied through outer influences and controlled as an analyzer and of a transparent object (OAM) arranged in the path of the rays betwen the polarizer and the analyzer. The object is designed as a polarization matrix or as one or several homogeneous, optically rotating substances.

16 Claims, 2 Drawing Sheets

IMAGE MODULATION PROCESS AND DEVICE FOR GENERATING OPTICAL EFFECTS

FIELD OF THE INVENTION

The invention relates to a method and a device for the modulation of images for displaying optical effects using radiation which originates from a light source and is polarized via a polarizer connected as an analyzer, and a translucent object which is arranged in the beam path between the polarizer and the analyzer.

SUMMARY OF THE INVENTION

The object of the invention is to produce dynamic images whose structure (local frequency) and, if required, color (chromaticity) are modulated and controlled by various audio-frequency signal sources. These images can either be displayed on a screen as a projection, for example with the aid of projection optics (for example a slide projector, overhead projector or the like) or else can be viewed in direct transmitted light (for example as in the case of a slide viewer). In addition, the method is also intended to make stereo projection and stereo viewing possible.

An optical element of this invention advantageously comprises an optically rotating liquid crystal, it being possible to influence the polarization behavior of the optical element by means of electrical, magnetic or mechanical influence. It is also conceivable for the element to be produced from a nematic liquid having chiral dopants, it either being possible to move the liquid or to apply sound or ultrasound to it. The latter has the advantage that the standing sound waves can additionally be made visible in a simple manner. It is also possible to apply changing or locally different temperatures to the liquid, as a result of which an image change in the sense of the invention is likewise obtained.

It is advantageous if a collimator and a heat protection filter are inserted in the beam path if it is intended to transmit relatively high light intensities. Imaging or viewing optics for specific applications are also advantageous.

There are a wide range of application possibilities for the method according to the invention and for a device operating in accordance with the method according to the invention; for example they can be used in illumination technology, to be precise advantageously in the case of audio-modulated or signal-modulated complex color and image dynamics. The introduction of the elements quoted above makes it possible to stage very highly complex color and light dramatic effects. It is thus possible to store complete stage-light scene effects on a small number of elements according to the invention, and to make these effects dynamic my means of signal sources.

The advantage over conventional lighting and light technology using lamp light is, inter alia, that new, complex lighting tasks can be solved in a versatile manner at an extremely low cost by means of the light dramatic effect which is stored in the elements.

The invention furthermore also offers a capability in opto-acoustic stimulation technology (OAS) (so-called MIND machines). Specific consciousness and relaxation states can be triggered using the previous OAS. In the past, this has been done only using monochromatic light from light-emitting diodes which are driven in a specific relationship with respect to the audio signal. This invention allows, for example, the audio signals of the OAS systems to be visualized in a new manner, using transmitted light, with the described stereo 3D glasses. Three-dimensional meditational color areas are produced, having new mental and aesthetic effects.

Further advantageous applications can be seen in that, for example, glass-clear sheets can be used as information carriers so that they are visible only to those who are wearing appropriate filter glasses, for example an analyzer. This technology can also advantageously be used in the case of credit cards, it being possible to recognize and record data in a simple and rapid manner. Furthermore, this technology is also of interest for an LC display which is appropriately prepared. The advantage is that the information which appears on the display is perceived only by the observer using an analyzer and not by other people who are present in the room.

Further advantageous applications result in the case of the implementation of colored LCD displays.

In accordance with the method according to the invention, colored LC displays of virtually any desired complexity can be optically stored by means of the OAM and can be electronically driven in a specific manner by any desired signals. Thus, a wide range of differently designed LCD displays can be achieved and can easily and rapidly be changed by changing a) the OAM which is designed, for example, as a plug-in frame and/or b) the control signals for the opto-electronic liquid crystal cell (NC).

In this way, both the color-graphic properties and the functional properties (image sequence) of the LC displays can be designed. The advantage over conventional LC display technology is that graphically complex and color displays can be implemented with very simple means.

BRIEF DESCRIPTION OF THE DRAWINGS

A plurality of exemplary embodiments of the invention are described in more detail in the following text with reference to the drawings, in which.

DETAILED DESCRIPTION

Figure 1:
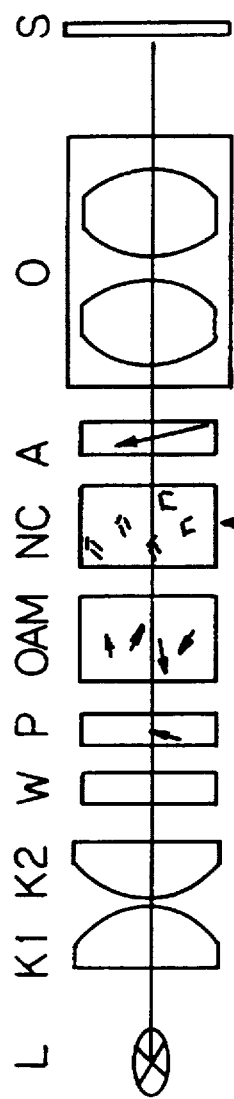
FIG. 1 shows the optical beam path in a device designed according to the invention.

In the case of the device according to the invention which is shown in FIG. 1, a polarizing filter (P) having linear polarization is introduced into the imaging plane in an optical beam path having a lamp (L), a double condenser ($K_1$, $K_2$) and a heat protection filter (W). The polarization angles can be adjusted by rotating the polarizing filter (P).

An optically active object, for example a matrix (OAM), is introduced into the beam path downstream. This OAM comprises optically rotating substances (ORD=optical rotation dispersion). By "optically rotate," it is understood that the material forming the OAM changes the polarization direction of the linearly polarization direction of the linearly polarized light as the light traverses the matrix. These can be either solid materials, such as Plexiglass, variously coated plastic films, or else liquids with optical rotation.

Figure 2:
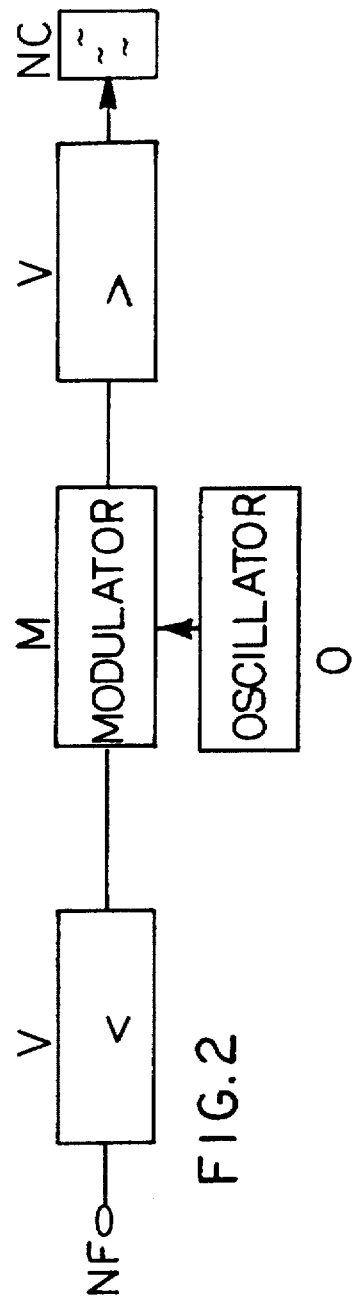
FIG. 2 shows the electrical drive of an element which acts optically.

This OAM forms the actual image. The image information is located in the different optical rotation of the substances used. The OAM then has an optically anisotropic, rotation-dispersive element, for example a liquid crystal cell (nematic cell (NC)) positioned downstream of it in the beam path. That is, an element that rotates the polarization plane of light as a function of the wavelength of the light applied to it. By using the NC, the optical rotation can now be oriented, depending on the principle, either electrically, magnetically or mechanically by means of ultrasound (US). The NCs have electrical orientations and can be driven dynamically by means of an electric fields. This is done, for example, using drive electronics (E) according to FIG. 2. In this way, for example, NCs having electrical orientation can be driven by any desired AF signal. The unit (E) comprises a 500 Hz oscillator or multivibrator, a modulator (M) and an AF amplifier (V).

In this way, the NCs can be driven with AF modulation from any desired signal source. The procedure in case of cells having magnetic orientation corresponds to this.

Figure 3:
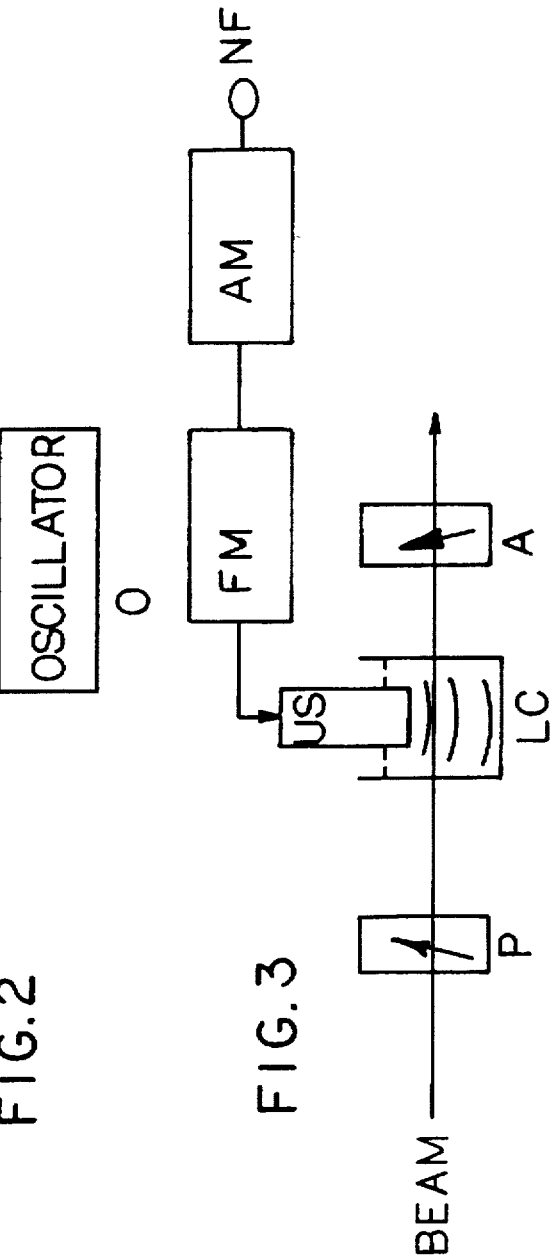
FIG. 3 shows a specially designed element, which acts optically, in the form of a liquid crystal.

A further special feature is represented by the modulation of a liquid NC in the form of a shallow trough with the aid of ultrasound as shown in FIG 3. A liquid crystal (LC) having chiral dopants is located in a shallow trough (for example for spectroscopy). The variation in the optical rotation is achieved on the basis of intensity modulation using frequency-modulated ultrasound, for example (30 kHz–1 MHz). For this purpose, the ultrasound probe (US) is coupled into the shallow trough at right angles to the beam path. The light passing through is modulated optically in an appropriate manner on the basis of the ultrasound sonic frequency modulation (frequency modulation=FM). The additional amplitude modulation (AM) of the ultrasound sonic signal allows further variability of the optical effects.

Figure 4:
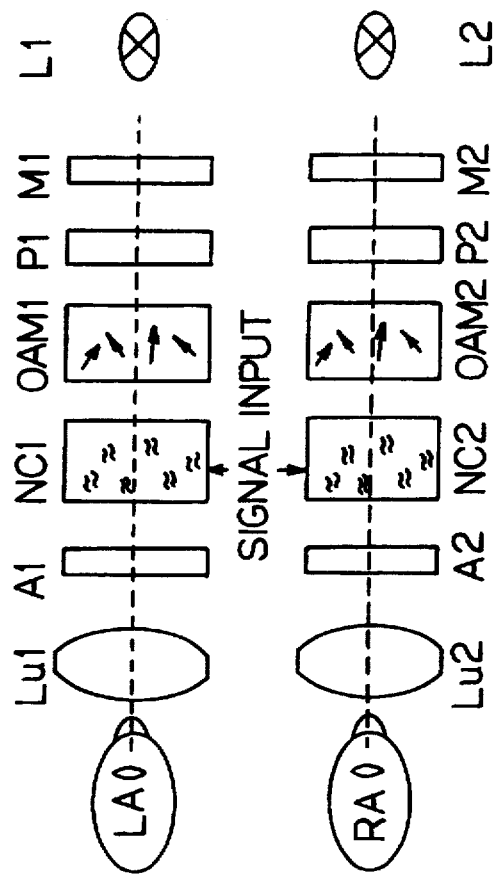
FIG. 4 shows two devices according to the invention which are connected in parallel and are combined to form stereo glasses.

The NC now has a further polarization filter (A) (linear-polarized) positioned after it as an analyzer, it being possible to achieve the rotation of the polarization angle by filter rotation. The image is now projected onto a screen (S) with the aid of a projection objective (O). The layout B comprising a magnifying lens (Lu), P, OAM, NC, A, M (matt glass sheet), and L is sufficient for use in transmitted light. For stereo viewing (FIG. 4), the layout must be designed in the binocular form, in which case it should be possible to control the eye separation.

Figure 5:
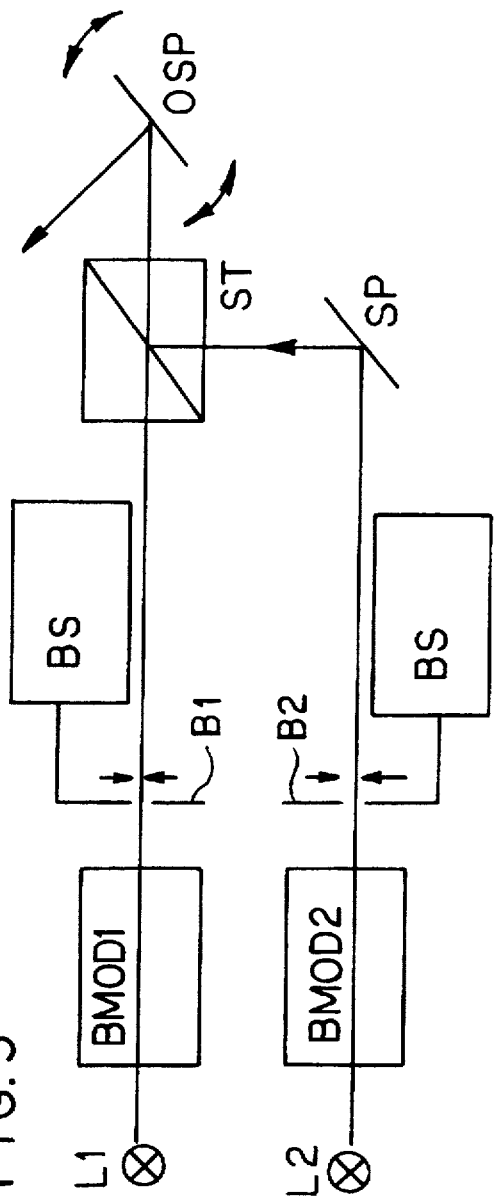
FIG. 5 shows two devices with shutters positioned in front of them according to the invention, whose beam paths are optically superimposed.

FIG. 5 shows two image modulators (BMOD$_1$, BMOD$_2$) which are illuminated via light sources (L$_1$, L$_2$). Two shutter devices (B$_1$, B$_2$), which are set via an electro-optical shutter controller (BS), are positioned in the beam path.

The shutter device (B$_1$) has a beam splitter (ST) positioned after it, to which beam splitter (ST) the beam path of the image modulator (BMOD$_2$) is fed. In order that both image modulators can be arranged in parallel, a deflection mirror (SP) is positioned after the shutter (B$_2$). In principle, as many image modulators as desired can be selected. A drivable optical beam positioning unit which may comprise, for example, a piezo-mirror is used for positioning the resulting beam.

I claim:

1. A method of producing modulating images comprising the steps of:

producing an optical beam from a light source;

polarizing said optical beam to produce a polarized optical beam;

applying said polarized optical beam to an optically active matrix, said optically active matrix being a structural order of optical modulating elements which are configured to optically rotationally disperse said polarized light beam to produce a basic image beam in which the rotational displacement of the polarized light forming said basic image beam is a function of the wavelength of the light;

applying said basic image beam to an optically anisotropic element that is birefringent so as to variably optically rotate said basic image beam, wherein the degree of optical rotation performed by said optically anisotropic element is a function of an external stimulus applied thereto so that said optically anisotropic element produces a modulated beam as a function of the external stimulus; and applying said modulated beam to a polarization analyzer to produce an output beam that contains a modulating image.

2. The method as claimed in claim 1, wherein said optically anisotropic element is designed as an optically rotating liquid crystal cell.

3. The method as claimed in claim 2, wherein the optical rotation of said optically anisotropic element is influenced by an electrical stimulus, a magnetic stimulus or a mechanical stimulus.

4. The method as claimed in claim 2, wherein said optically anisotropic element comprises a nematic liquid crystal having chiral dopants.

5. The method as claimed in claim 4, wherein said nematic liquid crystal is displaced so as to cause said production of said modulating image.

6. The method as claimed in claim 4, wherein the optical rotation performed by said liquid crystal is a function of sound or ultrasonic energy applied to said liquid crystal.

7. The method as claimed in claim 1, further including the step of applying said optical beam from said light source to a condenser prior to polarizing said optical beam.

8. The method as claimed in claim 7, further including the step of applying said modulated beam produced by said polarization analyzer to a image viewing device so that the modulating image can be viewed.

9. The method as claimed in claim 1, further including the step of applying said modulated beam produced by said polarization analyzer to a image viewing device so that the modulating image can be viewed.

10. A device for producing modulating images comprising: a light source for producing a light beam; a polarizer for polarizing the light beam; an analyzer for producing a polarization analyzed output beam and a translucent object which is arranged in a beam path that extends from the polarizer to the analyzer, the improvement wherein the translucent object includes:

an optically active matrix formed from material that performs an optical rotational dispersion of the polarized light beam from the polarizer to produce a basic image beam in which the rotational displacement of the polarized light forming the basic image beam is a function of the wavelength of the light; and an optically anisotropic element to which the basic image beam from said optically active matrix is applied, said optically anisotropic element being birefringent so as to variably optically rotate said basic image beam so as to produce a modulated beam that is applied to the polarizer analyzer wherein said optically anisotropic element varies the optical rotation of the modulated beam as a function of an external stimulus applied to said optically anisotropic element.

11. The device as claimed in claim 10, wherein said optically anisotropic element is an optically rotating liquid crystal.

12. The device as claimed in claim 11, wherein the optical polarization behavior of said optically anisotropic element is a function of an electrical stimulus, a magnetic stimulus or a mechanical stimulus.

13. The device as claimed in claim 11, wherein said optically anisotropic element comprises a nematic liquid crystal having chiral dopants.

14. The device as claimed in claim 10, wherein a collimator is disposed between the light source and the polarization analyzer.

15. The device as claimed in claim 14, further including an optical projector positioned to receive the output beam produced by the polarization analyzer and configured to produced a modulating image from the output beam.

16. The device as claimed in claim 10, further including an optical projector positioned to receive the output beam produced by the polarization analyzer and configured to produced a modulating image from said output beam.

* * * * *